United States Patent
Shteyn

(10) Patent No.: US 7,529,806 B1
(45) Date of Patent: *May 5, 2009

(54) PARTITIONING OF MP3 CONTENT FILE FOR EMULATING STREAMING

(75) Inventor: Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,257

(22) Filed: Nov. 4, 1999

(51) Int. Cl.
*G06F 15/16* (2006.01)
*H04N 7/173* (2006.01)
*H04K 1/00* (2006.01)

(52) U.S. Cl. .................... 709/217; 709/231; 709/203; 725/114; 705/50

(58) Field of Classification Search ......... 709/217–219, 709/231–234, 227; 725/90–100, 112; 345/718; 455/418
See application file for complete search history.

(56) References Cited

U.S. PATENT DOCUMENTS

| | | | | |
|---|---|---|---|---|
| 5,371,532 A | * | 12/1994 | Gelman et al. | 725/100 |
| 5,442,390 A | * | 8/1995 | Hooper et al. | 360/32 |
| 5,751,968 A | * | 5/1998 | Cohen | 709/201 |
| 5,890,172 A | * | 3/1999 | Borman et al. | 715/501.1 |
| 6,005,563 A | * | 12/1999 | White et al. | 345/718 |
| 6,012,098 A | * | 1/2000 | Bayeh et al. | 709/246 |
| 6,199,076 B1 | * | 3/2001 | Logan et al. | 715/501.1 |
| 6,263,371 B1 | * | 7/2001 | Geagan et al. | 709/231 |
| 6,311,058 B1 | * | 10/2001 | Wecker et al. | 455/418 |
| 6,356,933 B2 | * | 3/2002 | Mitchell et al. | 709/203 |
| 6,405,256 B1 | * | 6/2002 | Lin et al. | 709/231 |
| 6,449,638 B1 | * | 9/2002 | Wecker et al. | 709/217 |
| 6,493,758 B1 | * | 12/2002 | McLain | 709/227 |

FOREIGN PATENT DOCUMENTS

EP 0923033 A1 6/1999

OTHER PUBLICATIONS

Marc Girardot, et al. "Efficient Representation and Streaming of XML content over the Internet Medium", IEEE Conference on Multimedia and Expo., pp. 67-70, 2000.*
"RealNetworks Streaming Media Leadership" article on the web at: http://www.real.com/company/pressroom/rnleadership/index.html.
"Download tunes to a walkman" article on the web at: http://cnn.com/TECH/computing/9909/28/walkman.tunes.idg/index.html.
Java 2 platform API specification, "java.io Class SequenceInputStream" at http://java.sun.com/products/jdk/1.2/docs/api/java/io/SequenceInputStreams.html.

(Continued)

*Primary Examiner*—Wen-Tai Lin

(57) ABSTRACT

An electronic file, e.g., an MP3 file, is partitioned into a sequence of segments at the server side. The first segment is played out upon downloading. While the first segment is being played out, the second is being downloaded and buffered so that it is available when the play out of the first segment is completed. While playing out a current one of the segments, next one(s) of the segments are being downloaded and buffered. This partitioning and sequential play out enables to emulate streaming of a file and to minimize latency while downloading an electronic file.

16 Claims, 2 Drawing Sheets

OTHER PUBLICATIONS

Java 2 platform API specification, "java.io Class InputStream" at http://java.sun.com/products/jdk/1.2/docs/api/java/io/InputStreams.html.

Java 2 platform API specification, "Interface Enumeration" at http://java.sun.com/products/jdk/1.2/docs/api/java/io/FileInputStreams.html.

Java 2 platform API specification, "java.io Class FileInputStreams" at http://java.sun.com/products/jdk/1.2/docs/api/java/util/Enumeration.html.

Java 2 platform API specification, Java (TM) 2 Platform, Standard Edition, v1.2.2 API Specification on the Web at http://java.sun.com/products/jdk/1.2/docs/api/overview_summary.html.

"Efficient Representation and Streaming of XML Content Over the Internet Medium" XP002160596, 2000 IEEE Conf. On Multimedia and Expo.

* cited by examiner

```
<XML>
    <title>
    The best ever music
    </title>
    <artist>
    V.R. Famous
    </artist>
    <parts>                        (Preferred format)
        <part1>
            <length> 1024 </length>
            <format> MP3 </format>
            <location> ftp://137.27.52.87 </location>
            <min_bandwidth> 10,000 </min_bandwidth>
        </part1>

(Alternative format)
        </part1_alt>
            <length> 512 </length>
            <format> OTHER </format>
            <location> http:// yevgeniynet/ .... _</location>
            <min_bandwidth> 8,000 </min_bandwidth>
        </part_alt1>

...........

</parts>
</XML>
```

FIG. 2

PARTITIONING OF MP3 CONTENT FILE FOR EMULATING STREAMING

FIELD OF THE INVENTION

The invention relates to content and/or control communications between multiple computer systems, or to such communications between computer systems and consumer devices. Specifically, the invention relates to communication constrained by bandwidth or limited by data processing resources available to the receiving system or device, especially if the communications are received by the user in real time. The type of communications can be, e.g., broadcast, multi-cast or point-to-point.

BACKGROUND ART

Consider current major technologies for delivering digital content, such as audio, video, etc. The streaming method for audio, e.g., RealAudio by RealNetworks, consists of playing-out audio at a client device, while constantly sending data from the server to the client. The technology provided by RealNetworks comprises an encoder, a server, a splitter/cache and a player system with two-way intelligence to resolve network congestion, lost packet conditions and negotiate complex internet protocols. More specifically, the known technology comprises an automatic, variable bit-rate encoding and delivery system for audio and video. The system scales to megabit connection rates and dynamically adjust the transmission rate as delivery rate varies due to network congestion. The format and the encoding/decoding methods of the data are proprietary. The server and the client synchronize receiving and playing in a way pre-defined by the particular architecture. The communication stack software is tightly coupled to the interpretation layer (application and user interface (UI)). Manufacturers of such technology promote high level of integration between client and server software, as a complete vertical solution. This approach mostly excludes third parties from developing custom server software (e.g., advertizing, services) and/or client applications (UI, special effects, etc.).

Another known method is downloading of a content file from a remote computer with subsequent play-out on the client. MP3 is a widely known audio data format used within the downloading context. There are other data formats, e.g., MP4 for video data etc. The major advantage of the above mentioned method is its open data standard approach. As long as the right format of the content file is observed during encoding, client and server software/hardware manufacturers are free to develop their own solutions/products.

A major problem with the complete download approach is the inherent latency: there is a delay between the beginning of the download and the start of the play-out. The larger the file and or smaller the communication bandwidth, the longer it takes to transfer the content from the server to the client. This is particularly undesirable in consumer electronics systems, where perceived delay is detrimental to market acceptance of an open architecture.

SUMMARY OF THE INVENTION

It is an object of the invention to provide an open architecture solution for content delivery in a download approach that allows for a low or negligible play-out latency.

To this end the content file is split into multiple parts. Each part or segment requires a relatively short download time. Therefore, the play-out latency is determined by the download time of the first part. The size of the individual part can be determined by the communications bandwidth, e.g., through pinging for a latency-check. The client device/application receives control information about the content. This control information comprises, for example, information relating to the size and memory location of the whole file as well as of it parts at the server. If the client is not capable of processing split data, it proceeds with the traditional approach, i.e., downloads the whole file and then plays it out. In case the client is capable of processing parts of the content, it uses the relevant control information about the parts in order to continue downloading data, while playing. Data play-out, also called "rendering", is computation-intensive, since it requires a plurality of decoding operations. Data download is bandwidth-intensive. Accordingly, simultaneous play-out and downloading do not significantly compete for the same system resources. This separation between downloading and processing can be efficiently used in a multi-process and/or multi-thread environment.

Preferably, the information contains references to the file location as well as references to the locations of the parts. The intended bandwidth information is associated with the parts. The client may make its own decisions regarding how many parts to download before the start of the play out (execution).

The parts can have different data formats. The format of some of the parts can be proprietary. Information about alternative content parts, regarding bandwidth, format, location access options, etc., can be provided. Content parts can physically reside on different servers. Content can be split into parts consistent within the semantics of the content, e.g., end of musical phrase, paragraph, target control device, etc. A third party may insert its own content parts in between the original content parts. The third party parts contain, for example, advertisements, commentary, customization options. The format of parts for play-out may be chosen according to user-related information, e.g., personal preferences, level of access to premium services, quality of the equipment, bandwidth sharing/fluctuation conditions, etc.

BRIEF DESCRIPTION OF THE DRAWINGS

The invention is explained in further detail and by way of example with reference to the accompanying drawing wherein:

FIG. 2 gives an example of control code.

Figure 1:
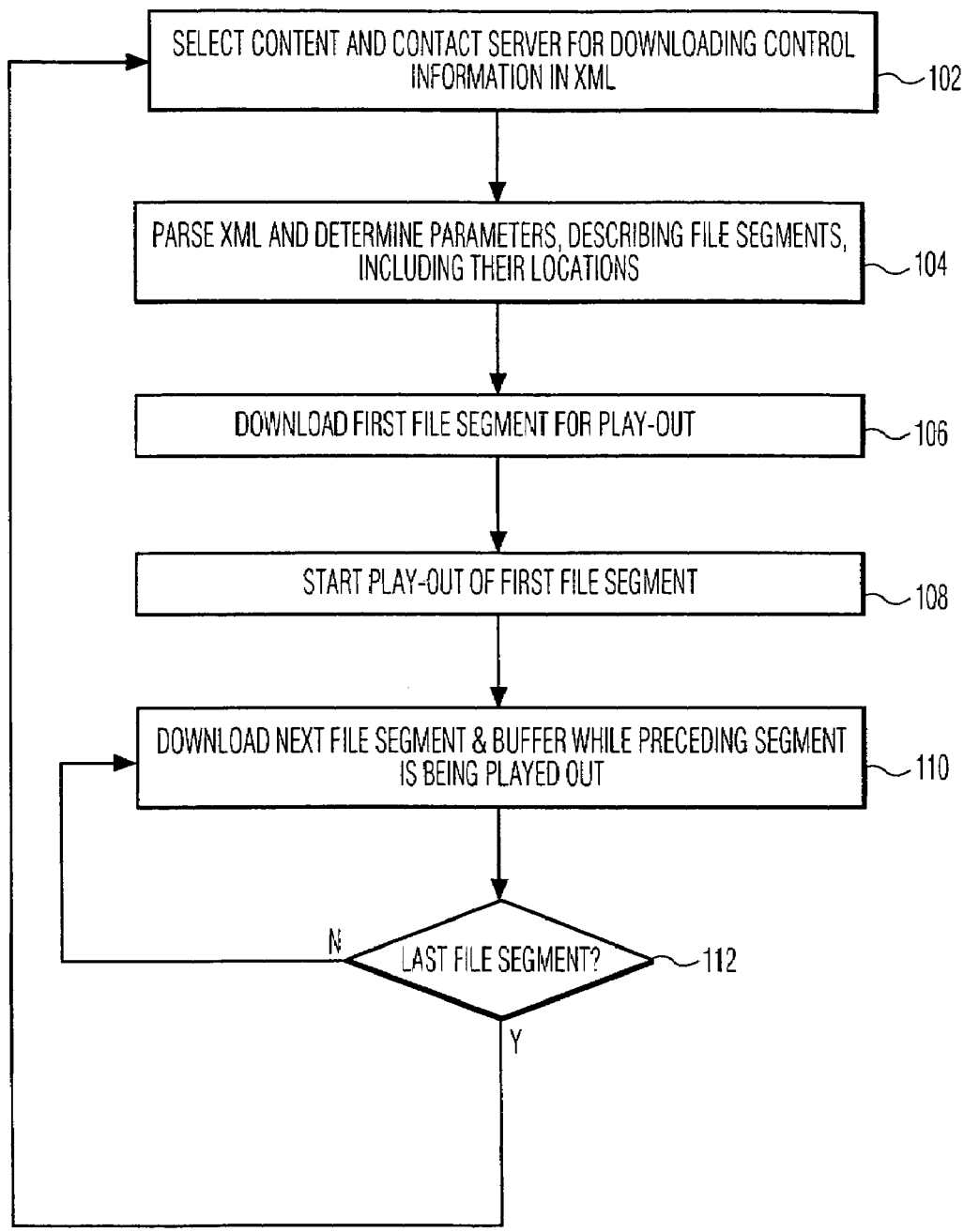
FIG. 1 is a flow diagram illustrating the various steps in a method according to the invention.

Throughout the Figures, same reference labels indicate similar or corresponding features.

PREFERRED EMBODIMENTS

The invention enables emulating the streaming of files while using a download approach. FIG. 1 illustrates a flow diagram 100 with various steps involved in the playing-out of a segmented file at the client.

In step 102, the client contacts the server selects the particular content file and downloads the control information that enables the retrieving and playing out of the segmented file. The control information describes the locations, e.g., URL's, and size of the various file segments, and provides, e.g., UI functionalities at the client. In this example, the control information is coded in XML.

In step 104 the XML code is parsed. Parsing of XML is well known in the art. A person skilled in the art can download an XML interpreter, including source code, from the Internet, see e.g. www.ibm.com/xml. Thus, the client is enabled to get information about the content information and the URLs of the first and subsequent file segments.

In step 106, the first file segment is downloaded for play-out. Communicating with a remote server is a well known technology. For example, Java 2.0 provides a set of standard classes that enable retrieving a remote file into a buffer or as a stream.

In step 108, the rendering of the first segment is started. The buffered content of the first segment is forwarded to a decoding/playing module. The decoding/playing module decodes the file format, e.g., MP3. The playing of the supplied stream of bits involves a number of standard operating system calls to its drivers a technique well known in the art.

In step 110, the next file segment is downloaded at the client and stored in a buffer while the previous file segment, here the first file segment, is being played out. One option is to have the downloaded files buffered in a sequence or linked list of buffers. This functionality is typically provided by the operating system of the client. For example, MS Windows family of products creates a memory buffer associated with the file every time an API call opens the file. Alternatively, in a thread- and/or process-rich environment, several threads and/or processes can be organized to independently retrieve file segments, while playing out the content of other segments. Working with threads is a skill common for software engineers. For example, Java 2.0 from Sun Microsystems provides classes supporting multiple threads. Similarly, Microsoft SDK for the Windows family of products makes thread- or process-related functionalities available to programmers.

Upon completion of playing out the first segment, the second segment is passed on from the buffer to the decoding/playing module. This can be implemented by means of, e.g., a linked list. As known, a linked list is a data structure wherein each element (here: segment) has content data and a pointer to a next element (here: next segment).

The decoding/playing module has to decode the file format. The decoding program represents a standard task to a person skilled in the art to program a decoding procedure according to a widely published standard (MP3, etc.). The playing of the supplied stream of bits involves a number of standard operating system calls to its drivers—a technique well known in the art.

FIG. 2 gives an example of information-describing content coded in XML. The code fragment labels the segments as having a title "The best ever music" performed by "V. R. Famous" and having several parts. The segment labeled "part1" is in a preferred format and described the length of the part, e.g., in bytes, the format, the minimum bandwidth required for a connection, and the location on the Internet. An alternative first part is labeled "part1 alt" having a different length, different format, different minimum bandwidth requirement, and a different location. The XML code can be combined with XSL for generating a user level UI at the user's client. The client thus can automatically choose the format compatible with the client's play-out capabilities.

When the client has selected the proper file, either the one of which the first part is represented here as in the preferred format or the one in the alternative format, the content of the first part is downloaded from the location specified and playing out is started automatically under application control. Combining multiple sequenced inputs is well understood in the industry. For example, Java JDK v.1.2 from Sun Microsystems, Inc. provides a class java.io.SequenceInputStream as a standard component of the io class library. SequenceInputStream represents the logical concatenation of other input streams. It starts out with an ordered collection of input streams and reads from the first one until end of file is reached, whereupon it reads from the second one, and so on, until end of file is reached on the last of the contained input streams. An object of the java.io.SequenceInputStream class can be initialized by, e.g., enumeration of objects of the InputStream class. This abstract class is the superclass of all classes representing an input stream of bytes, including the class FileInputStream. In case of the downloading of multiple file parts, an application can create instances of the FileInputStream class from local temporary files into which the parts are being downloaded. The contents of those multiple local files will be supplied to the Sequencer. The rendering component of the application will read the information out it as if it were just a single local file.

The segmentation of the content file into separately downloadable segments enables a third party, such as a service provider, to insert between two segments specific content information, e.g., advertisements to be rendered on the client's display.

During operation, the client application could select a next segment in a different format for the same content to adapt to changing circumstances, e.g., lower bandwidth due to network congestion. Also, the user could be prompted to subscribe to a service that as a demo lets the user download only the first segment in a high quality and the next segments in a lower quality. The combination of XML and a corresponding parser and interpreter at the client controls the downloading and playing out as explained above. Accordingly, the client pulls the content segments from the locations indicated in the XML control information for buffering and subsequent playout.

The implementation of a client in this client-server architecture can be done in a variety of ways. A first example is a hardware-based single-purpose device, similar to the Rio MP3 player by the Diamond Corp. In order to accommodate the method of the invention, the player needs, in addition, an XML parser, the ability to interpret XML and the ability to download and play-out content segments sequentially. A second example is to implement the method of the invention as a software application on a multi-purpose computing device, e.g., a PC or a set top box. The device has the software implementing the functionalities mentioned above. In a graphics-rich environment, multiple GUI's are represented to the user for further customization.

The following co-pending applications are incorporated herein by reference:

U.S. Ser. No. 09/406,642 filed Sep. 27, 1999 for Raoul Mallart for SCALABLE SYSTEM FOR VIDEO-ON-DEMAND. This patent document relates to a Video-on-Demand service (VOD) that is emulated in a Near-Video-on-Demand (NVOD) architecture. Content information is made available to an end-user in the NVOD architecture. An introductory portion of the content information is stored at the end-user's equipment, e.g., by downloading overnight. During playing out of the introductory portion at the end-user enabling the content information supplied in the NVOD architecture is buffered at the end-user's equipment. The equipment is controlled to switch from playing out the introductory portion stored to playing out the buffered content information.

U.S. Ser. No. 09/189,534 filed Nov. 10, 1998 for Eugene Shteyn for CONTENT SUPPLIED AS SOFTWARE OBJECTS FOR COPYRIGHT PROTECTION. This document relates to supplying content information such as a movie, an audio file or a textual message to an end-user in a software object. The object has an encapsulated procedure for end-user access of the content information in a runtime environment. The object can specify time frame for and manner wherein the content information is to be accessed. Since the procedure is encapsulated in the object together with the content data, and since transport of the object over the Internet is done after serializing, an adequate degree of security is provided against unauthorized play-out or copying.

U.S. Ser. No. 09/149,950 filed Sep. 9, 1998 for Raoul Mallart for REAL TIME VIDEO GAME USES EMULATION OF STREAMING OVER THE INTERNET IN A BROADCAST EVENT. This patent document relates to emulating streaming of animation data over the Internet to a large number of clients in a broadcast application on a client-server network. The animation is considered a sequence of states. State information is sent to the clients instead of the graphics data itself. The clients generate the animation data itself under control of the state information. The server and clients communicate using a shared object protocol. Thus, streaming is accomplished as well as a broadcast without running into severe network bandwidth problems. This is approach is used to map a real life event, e.g., a motor race, onto a virtual environment in order to let the user participate in a virtual race against the real life professionals, the dynamics of the virtual environment being determined by the state changes sent to the user.

U.S. Ser. No. 09/138,782 filed Aug. 24, 1998 for Raoul Mallart and Atul Sinha for EMULATION OF STREAMING OVER THE INTERNET IN A BROADCAST APPLICATION. In a broadcast application on a client-server network the streaming is emulated of animation data over the Internet to a large number of clients. The animation is considered a sequence of states. State information is sent to the clients instead of the graphics data itself. The clients generate the animation data itself under control of the state information. The server and clients communicate using a shared object protocol. Thus, streaming is accomplished as well as a broadcast without running into severe network bandwidth problems.

U.S. Ser. No. 09/283,545 filed Apr. 1, 1999 for Eugene Shteyn for TIME- AND LOCATION-DRIVEN PERSONALIZED TV. This document relates to a service for personalized video recorders such as the one from TiVo-Philips. The recorder has a hard-disk that serves as a random-access buffer.

I claim:

1. A method of, at a client device, forming a media presentation from multiple related files, including a control information file, stored on one or more server computers within a computer network, the method comprising acts of:
   downloading the control information file to the client device;
   the client device parsing the control information file; and
   based on parsing of the control information file, the client device:
   identifying multiple alternative flies corresponding to a given segment of the media presentation,
   determining which files of the multiple alternative files to retrieve based on system restraints;
   retrieving the determined file of the multiple alternative files to begin a media presentation, wherein if the determined file is one of a plurality of files required for the media presentation, the method further comprises acts of:
   concurrent with the media presentation, retrieving a next file; and
   using content of the next file to continue the media presentation.

2. The method of claim 1, wherein partitioning of media presentation information between the multiple related files is determined by information about the client.

3. The method of claim 1, wherein partitioning of media presentation information between the multiple related files is determined by information about the computer network.

4. The method of claim 1, wherein the media presentation comprises an audio presentation.

5. The method of claim 1, wherein the media presentation comprises a video presentation.

6. The method of claim 1, wherein partitioning of media presentation information between the multiple related files is described within the control information file using tags corresponding to respective files.

7. The method of claim 1 wherein the control information file is an XML file.

8. The method of claim 7, wherein the XML file identifies the multiple alternative files corresponding to the given segment of the media presentation, further comprising an act of partitioning the media presentation into multiple MP3 files corresponding to a portion of the multiple alternative files.

9. A method of storing media presentation information within a computer network including multiple server computers, the method comprising acts of:
   storing on a server computer a control information file of a format to be parsed by a client device; and
   storing on one or more server computers multiple alternative files corresponding to a given segment of a media presentation accessible by the client device to, based on parsing of the control information file, determine which file of the multiple alternative files to retrieve based on system constraints to form a media presentation from the multiple alternative files.

10. The method of claim 9, wherein the control information file is an XML file.

11. The method of claim 10, wherein the XML file identifies the multiple alternative files corresponding to the given segment of the media presentation.

12. A client device for forming a media presentation from multiple related files stored on server computers within a computer network, comprising:
   means for downloading files to the client device;
   means for parsing a control information file; and
   means for parsing, based on parsing of the control information file:
   identifying multiple alternative files corresponding to a give segment of the media presentation;
   determining which file of the multiple alternative files to retrieve based on system constraints;
   retrieving the determined file of the multiple alternative files to begin a media presentation, wherein if the determined file is one of a plurality of files required for the media presentation, the means for parsing comprises means for:
   concurrent with the media presentation, retrieving a next file; and
   using content of the next file to continue the media presentation.

13. The device of claim 12, wherein the control information file is an XML file.

14. The device of claim 13, wherein the XML file identifies multiple alternative MP3 files corresponding to a portion of the given segment of the media presentation, the means for retrieving comprising means for selecting and retrieving one of the multiple alternative MP3 files.

15. The device of claim 12, wherein:
the device interprets the control information to retrieve multiple files from the computer network for sequential play-out.

16. The device of claim 15, wherein:
the means for parsing comprises an XML parser; and
the retrieving and using comprises an XML interpreter.

* * * * *